UNITED STATES PATENT OFFICE.

GEORGE D. COLEMAN, OF BROOKLINE, MASSACHUSETTS.

STRUCTURAL PRESERVATIVE.

937,227.  Specification of Letters Patent.  Patented Oct. 19, 1909.

No Drawing.  Application filed November 6, 1905. Serial No. 286,148.

*To all whom it may concern:*

Be it known that I, GEORGE D. COLEMAN, a citizen of the United States, residing at Brookline, in the county of Norfolk and State of Massachusetts, have invented certain new and useful Improvements in Structural Preservatives; and I do hereby declare the following to be a full, clear, and exact description of the invention, such as will enable others skilled in the art to which it appertains to make and use the same.

The present invention relates to an improvement in structural preservatives.

Experience with the structural preservative described and claimed in my co-pending application filed March 20th, 1905, Serial No. 251,172 has demonstrated its capacity to form a protective coating for steel structural work. The coating of that application consisted of a layer of slow drying paint applied to the surface of the structure, an anchoring layer of granulated material embodied in the surface of the paint, and a layer of hydraulic cement. The specific material which formed the anchoring layer in the embodiment of that application consisted of comminuted lead which gave the coating a co-efficient of expansion substantially identical with that of steel.

The present invention relates to an improvement upon the preservative of the said application, which materially diminishes the cost of the coating without impairing its quality.

According to the present invention the surface of the structure to be coated will first be cleaned, preferably by the use of a sand blast, to expose the clean metal, if the structure be of metal, and then to the surface thus cleaned is applied a layer of slow drying paint. An excellent paint for this purpose is made of litharge and hydrated oxid of lead worked up with raw linseed oil in which no drier is used. The hydrated oxid of lead forms with the oil a very tough adhesive material which is resilient and elastic but dense, and which will securely attach itself to the surface of the structure irrespective of its irregularities, and which will not break or crack with the come and go of the parts thereof. While this layer of paint is still moist and tacky the surface is sprayed with what I term "brick meal." This comprises the anchoring layer of the coating and forms the means of holding the outer layer of hydraulic cement in place. The brick meal consists of angular particles of baked earthy or clayey material, and is conveniently obtained by crushing fragments of overburnt brick. The characteristic quality of the material is its porosity and its sharp angular nature which enables it to form a very strong bond with the hydraulic cement applied thereto. The nature of the bond between the brick meal and the hydraulic cement is not precisely known, but it is believed that the surface of the particles unite with the caustics of the cement and thereby form a chemical as well as a mechanical bond between the anchoring layer and the cement.

I prefer to grind the brick to a fineness of from 20 to 80 mesh and mix it with comminuted lead, say from 60 to 80 mesh in size. This mixing is preferably done with the addition of a small quantity of hydraulic cement in the presence of a sufficient quantity of water to dampen the materials. The best proportions for the mixture will be 850 pounds of brick meal, 100 pounds of lead and 50 pounds of hydraulic, preferably Portland cement. These are placed together in a receptacle and tumbled with enough water added to dampen the contents until the particles of brick and lead and cement are intimately mixed. This preliminary mixing and tumbling process seems to coat the particles of brick with metallic lead and Portland cement, with the result that the particles after having been applied to the paint will securely hold the layer of cement. It is to be understood, of course, that I do not limit myself to these proportions or to these ingredients, but it is intended that the invention should comprehend the employment of a slow drying paint and layer of anchoring material consisting of pulverulent baked earthy material and a layer of hydraulic cement. The excellent quality of a coating made of these materials recommend it to users. The surface being of hydraulic cement is insensible to deterioration by moisture or carbonic acid, or even the sulfurous acid exhaled by locomotives standing in train sheds or passing under bridges or through tunnels, whereby the structure is preserved for a length of time which cannot yet be predicted. Structures covered with this coating do not show any alligator skin cracking appearance but are persistent in adhesion continuous in surface and hard and dense.

Having thus described the invention, what is claimed is:

A structural preservative for iron and steel structures, such as train sheds, consisting of a layer of strongly adhesive slow drying paint applied to the surface of the structure, and forming after hardening a hard and dense coating, an anchoring layer of pulverulent baked earthy material embedded in the surface of the paint and projecting therefrom, and a layer of hydraulic cement laid upon and united to the surface of the anchoring layer, forming a continuous protecting surface insensible to deterioration by moisture or carbonic acid or sulfurous acid, substantially as described.

In testimony whereof I affix my signature, in presence of two witnesses.

GEORGE D. COLEMAN.

Witnesses:
HORACE VAN EVEREN,
ALFRED H. HILDRETH.